United States Patent
Lush (10) Patent No.: US 7,503,282 B1
(45) Date of Patent: Mar. 17, 2009

(54) MULTI-TIER FEEDER

(76) Inventor: Raymon W. Lush, 410 Main St., Bloomfield, NE (US) 68718

( * ) Notice: Subject to any disclaimer, the term of this patent is extended or adjusted under 35 U.S.C. 154(b) by 63 days.

(21) Appl. No.: 11/706,903

(22) Filed: Feb. 13, 2007

Related U.S. Application Data (63) Continuation-in-part of application No. 11/480,607, filed on Jul. 3, 2006, now Pat. No. 7,185,605.

(51) Int. Cl.
*A01K 5/00* (2006.01)

(52) U.S. Cl. .................................. 119/52.2

(58) Field of Classification Search ........... 119/52.2, 119/52.1, 51.01, 61.5, 429, 430, 431, 207, 119/221, 223, 224, 225; 220/8, 9.2, 9.3; D30/124
See application file for complete search history.

(56) References Cited

U.S. PATENT DOCUMENTS

| | | | | |
|---|---|---|---|---|
| 3,399,650 A | * | 9/1968 | Goodman | 119/51.03 |
| 4,434,745 A | * | 3/1984 | Perkins et al. | 119/57.9 |
| 5,758,596 A | * | 6/1998 | Loiselle | 119/52.2 |
| 5,826,539 A | * | 10/1998 | Bloedorn | 119/52.2 |
| 6,047,661 A | * | 4/2000 | Lush | 119/51.01 |
| 6,073,582 A | * | 6/2000 | Lush | 119/51.01 |
| 6,360,690 B1 | * | 3/2002 | Canby | 119/52.2 |
| 6,427,629 B1 | * | 8/2002 | Lush | 119/52.1 |
| 7,237,508 B1 | * | 7/2007 | Lush | 119/57.8 |

* cited by examiner

*Primary Examiner*—Yvonne R. Abbott
(74) *Attorney, Agent, or Firm*—Dennis L. Thomte; Thomte Patent Law Office LLC (57) ABSTRACT

A rigid, multi-tier bird feeder which is comprised of a plurality of stacked non-collapsible bird feeder bodies to as to provide a multi-tiered bird feeder having a large capacity. The multi-tiered bird feeder includes perches thereon as well as even feed baffle plates positioned therein which maintain a certain amount of feed thereabove even though the main level of feed has dropped therebelow. The multiple feeder bodies may be selectively removably secured together to enable a wide variety of possible feeder configurations. Each of the feeder bodies may have a truncated-cone shape joined to another truncated cone-shaped feeder body so as to define lantern shape or an hourglass shape. Each of the feeder bodies may also define a lantern shape or an hourglass shape.

14 Claims, 7 Drawing Sheets

MULTI-TIER FEEDER

CROSS-REFERENCE TO RELATED APPLICATION

This is a continuation-in-part application of Petitioner's earlier application Ser. No. 11/480,607 filed Jul. 3, 2006, now U.S. Pat. No. 7,185,605 entitled MULTI-TIER COLLAPSIBLE FEEDER.

BACKGROUND OF THE INVENTION

1. Field of the Invention

This invention relates to a feeder and more particularly to a feeder for birds, squirrels and the like which is convenient to install, convenient for wild game to perch upon, and which is resistant to damage from squirrels and other feeding wildlife. More particularly, the invention disclosed herein relates to a multi-tier feeder. Even more particularly, this invention relates to a multi-tier feeder of rigid construction wherein the feeder bodies thereof may be selectively removably secured together.

2. Description of the Related Art

Wire mesh feeders constructed of rigid steel wire are well known to those skilled in the art of wild game feeding. The rigid steel wire mesh feeders are frequently used to hold blocks of suet or mixtures of seed, animal fat, peanut butter and the like. Normally, the rigid wire mesh feeders of the prior art usually, if not always, consist of a single feeder body which severely limits the capacity of the feeder and limits the number of birds which may feed from the feeder at one time. In applicant's co-pending application, a multi-tier feeder is disclosed with the feeder being collapsible. Although the feeder of the co-pending application has met with great acceptance, some persons seem to prefer rigid feeders of the tubular type. It is for those persons that the instant feeder has been designed while maintaining applicant's novel multi-tier "hourglass" or "lantern" configuration.

SUMMARY OF THE INVENTION

A rigid, multi-tiered, tubular bird feeder is disclosed comprising a plurality of stacked non-collapsible bird feeder bodies so as to provide a multi-tiered bird feeder which has a very large capacity. Further, the multi-tiered bird feeder of this invention includes perches thereon as well as even feed baffle plates positioned therein which maintain a certain amount of feed thereabove, even though the main level of feed has dropped therebelow. Preferably, but not necessarily, the multiple feeder bodies of this invention are selectively removably secured together to enable a wide variety of possible feeder configurations. The bird feeder of this invention may be termed a "tube" type feeder but which has multiple "hourglass" or "lantern" sections joined together.

It is therefore a principal object of the invention to provide a multi-tiered bird feeder.

Still another object of the invention is to provide a multi-tiered bird feeder having an improved storage capacity for bird feed.

Yet another object of the invention is to provide a multi-tiered bird feeder including even feed baffle plates positioned therein in a vertically spaced-apart manner to maintain a certain amount of bird feed thereabove, even though the main level of bird feed has fallen therebelow.

Yet another object of the invention is to provide a multi-tier feeder wherein the feeder bodies thereof are selectively removably secured together.

These and other objects will be obvious to those skilled in the art.

DETAILED DESCRIPTION OF THE INVENTION

Figure 1:
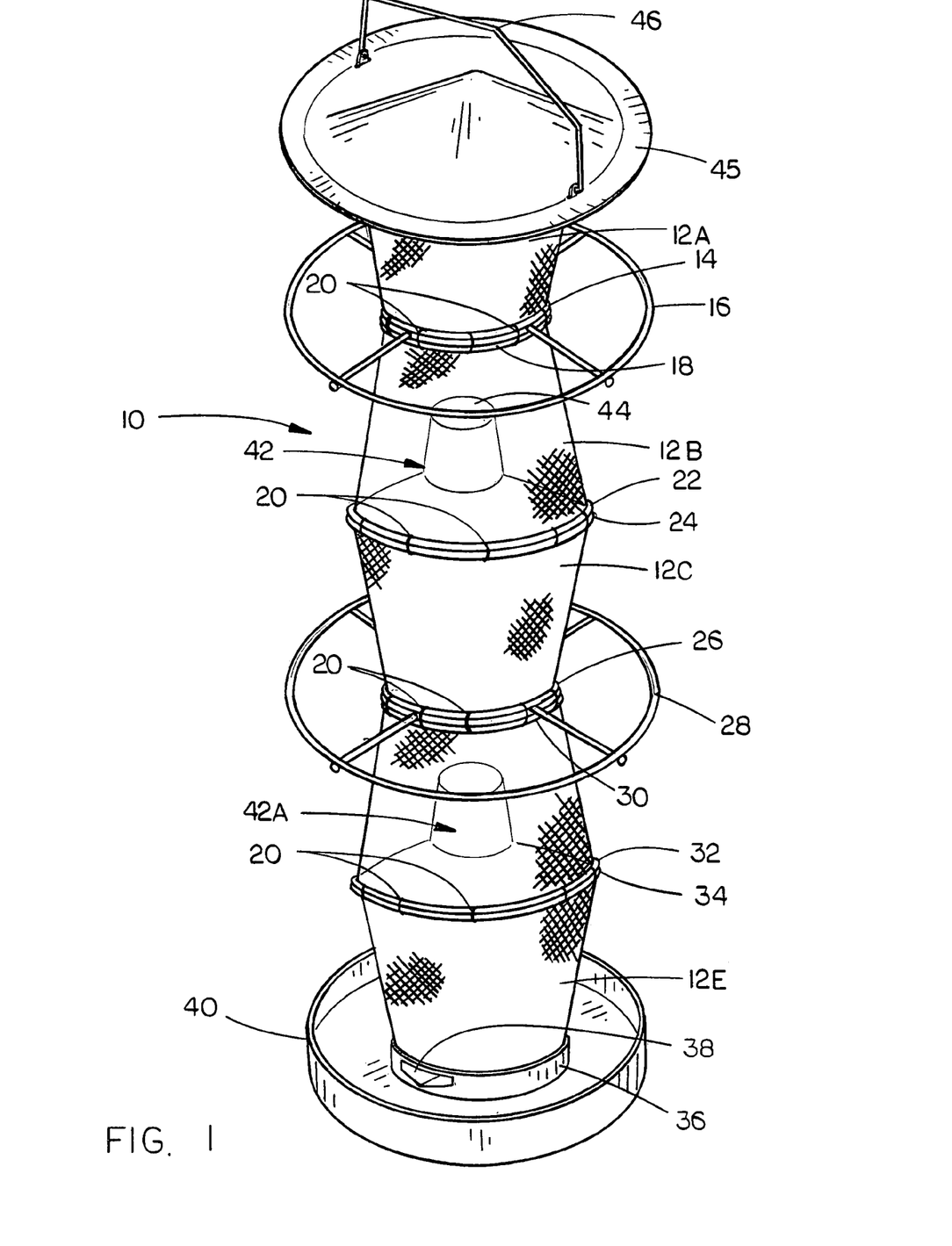
FIG. 1 is a perspective view of one form of the multi-tier feeder of this invention.
Figure 2:
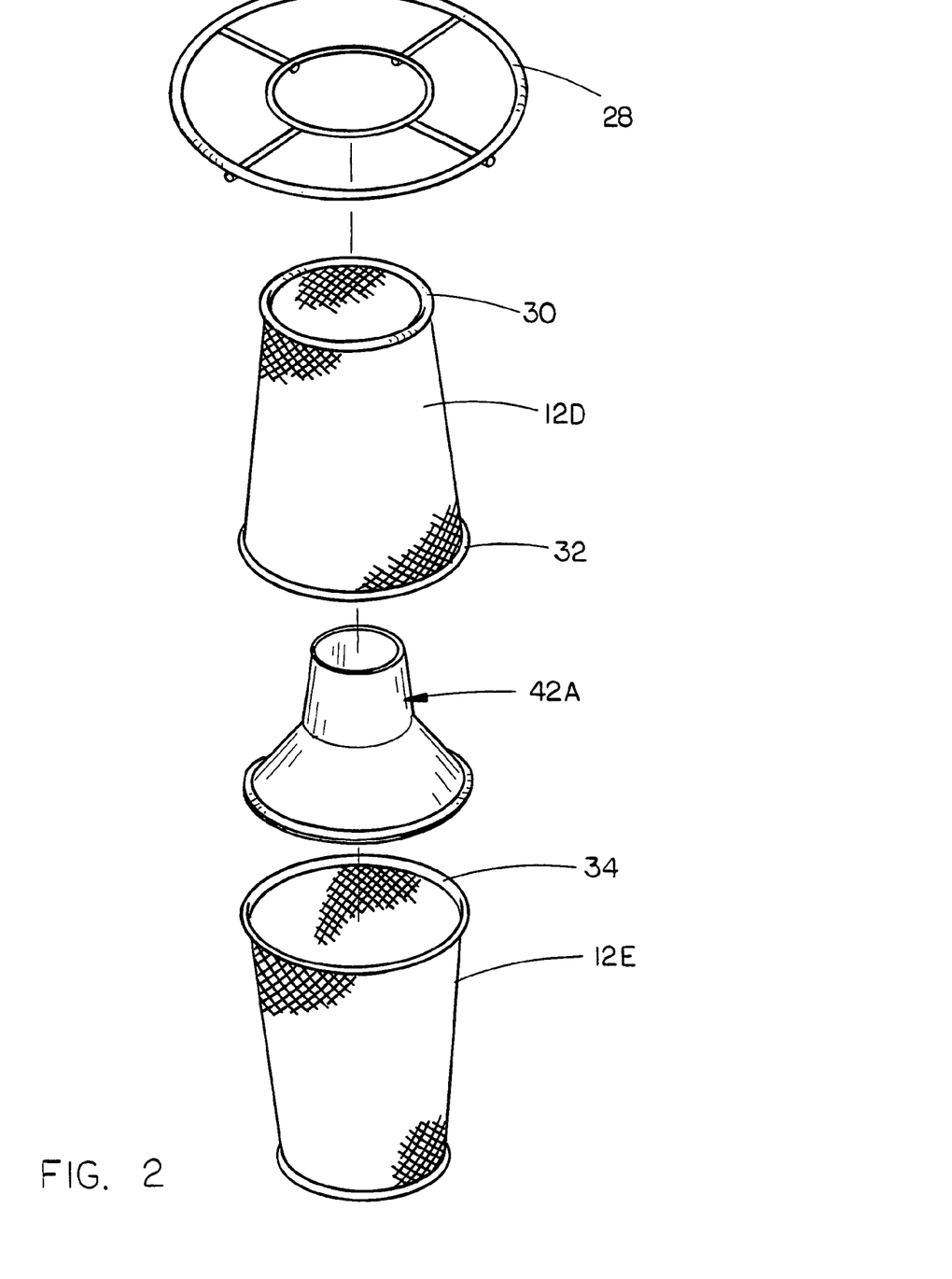
FIG. 2 is an exploded perspective view of a portion of the feeder of FIG. 1.
Figure 3:
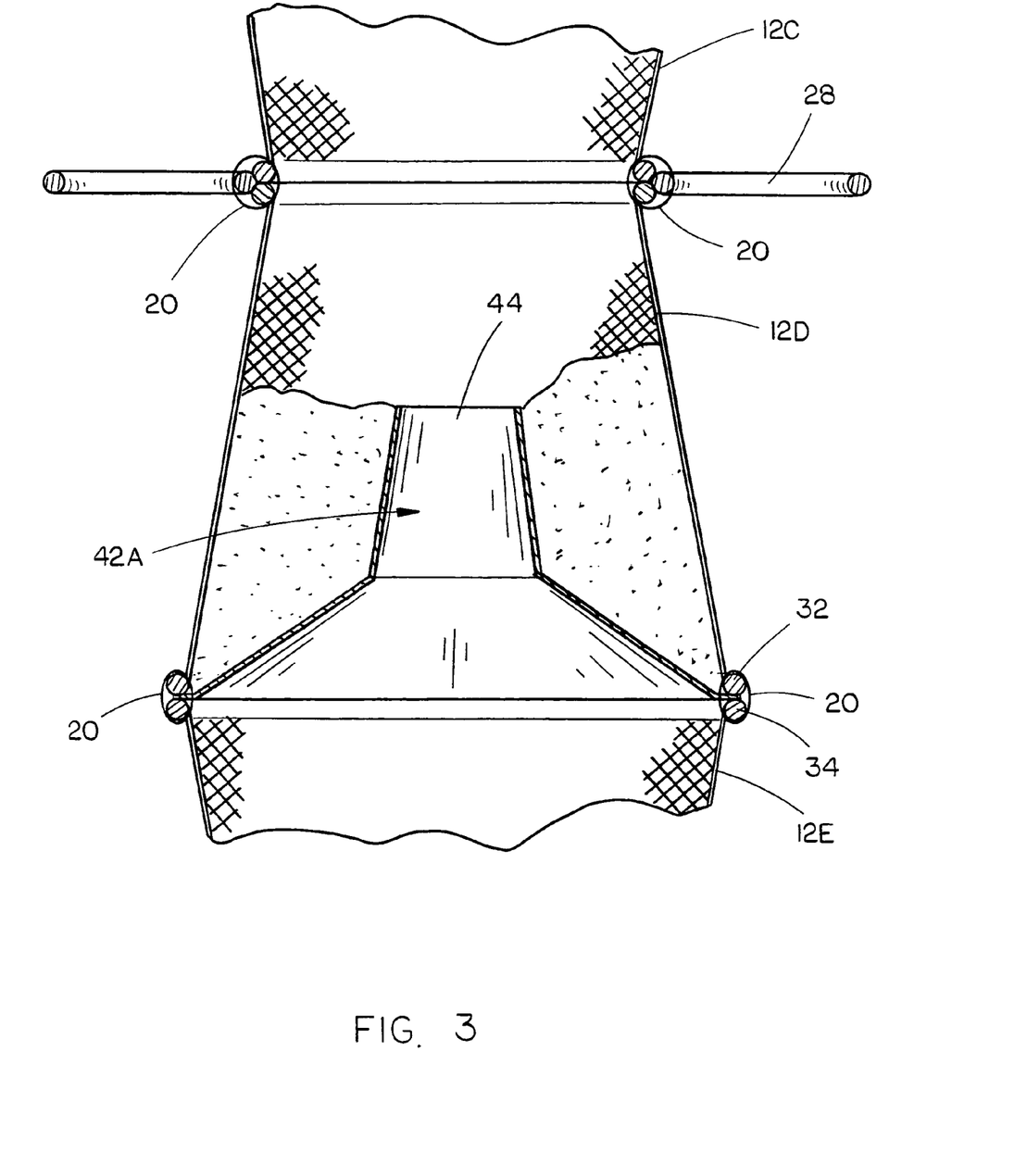
FIG. 3 is a partial view of the feeder of FIG. 1 with portions thereof cut away to more fully illustrate the invention.

FIG. 1 is a perspective view of the tube-type feeder of this invention which is a multi-tier feeder. In FIG. 1, the numeral 10 refers to the multi-tier feeder which is comprised of a plurality of feeder bodies 12 and which are arranged in an alternating stacked fashion so as to provide a non-collapsible, multi-tiered bird feeder. FIG. 1 illustrates a five-tier bird feeder although any number of tiers could be utilized greater than one. See FIGS. 8-10 and 12-14 for examples of a three-tier feeder 10A, a four-tier feeder 10B, another four-tier feeder 10C, a six-tier feeder 10D, a seven-tier feeder 10E and an eight-tier feeder 10F. With respect to the feeder 10 illustrated in FIG. 1, feeder bodies 12A, 12B, 12C, 12D and 12E are connected together in a stacked manner. Feeder body 12A is provided with a support ring 14 at its lower end which is secured to the inner end of a perch ring 16 and support ring 18 which is secured to the upper end of feeder body 12B. FIG. 1 illustrates that the support member 14, perch ring 16 and support ring 18 are secured together by ties, although other means could be utilized. Further, the perch ring 16 is optional and may be completely deleted from the feeder. Feeder body 12B has a support ring 22 at its lower end which is secured to support ring 24 at the upper end of feeder body 12C. Ties 20 secure the support rings 22 and 24 together.

Support ring 26 is provided at the lower end of feeder body 12C and it is secured to perch ring 28 and support ring 30 which is secured to the upper end of feeder body 12D. Again, the perch ring 28 may be deleted. The support ring 26, perch ring 28 and support ring 30 are secured together by ties 20.

The lower end of feeder body 12D has a support ring 32 secured thereto which is secured to support ring 34 by ties 20. Support ring 34 is secured to the upper end of feeder body 12E. An optional ring 36 may be provided at the lower end of feeder body 12E which has feed outlets formed therein so that feed is dispensed into the tray 40. If the feed outlets 38 are utilized, the tray 40 is necessary. If the feed outlets 38 are not utilized, the tray 40 is optional but is preferred to catch feed falling from the feeder bodies.

Figures 8, 9, 10, 11:
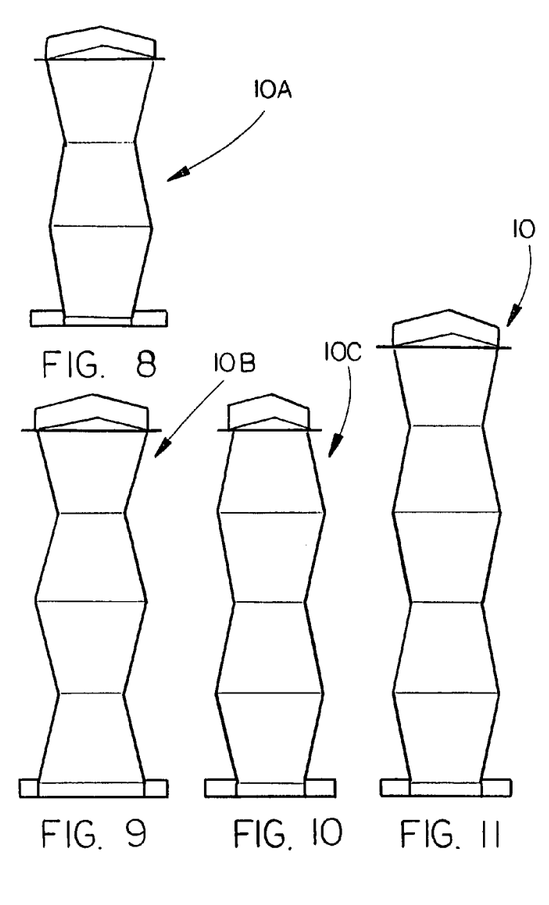
FIG. 8 is a side schematic view of a three-tier feeder of this invention.
FIG. 9 is a side schematic view of a four-tier feeder of this invention.
FIG. 10 is a side schematic view of another four-tier feeder of this invention.
FIG. 11 is a side schematic view of a five-tier feeder of this invention.
Figure 12:
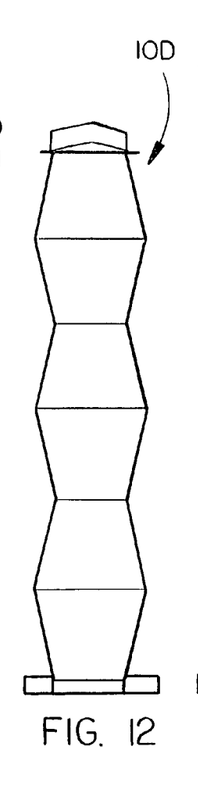
FIG. 12 is a side schematic view of a six-tier feeder of this invention.
Figure 13:
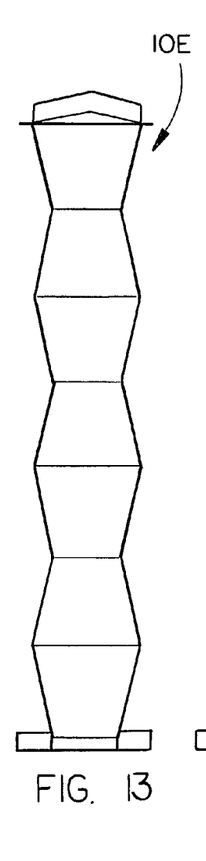
FIG. 13 is a side schematic view of a seven-tier feeder of this invention.
Figure 14:
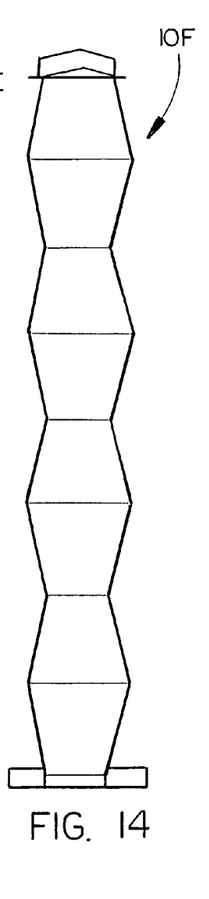
FIG. 14 is a side schematic view of an eight-tier feeder of this invention.

Preferably, a truncated, funnel-shaped even feed baffle 42 is provided between the feeder bodies 12B and 12C and has an opening 44 formed therein to permit feed to flow downwardly therethrough to the other feeder bodies. Similarly, a baffle 42A is provided between the feeder bodies 12D and 12E. The baffles 42 and 42A are preferred, but may be omitted in some feeders. A cover 44 selectively closes the upper end of feeder body 12A and has a hanger 46 associated therewith. The feeder bodies 12 are constructed of a metal mesh wall which is non-collapsible. The openings of the metal mesh wall are sized to maintain the feed therein while permitting birds to feed therethrough. Each of the feeder bodies 12 are of the truncated, conical shape to provide a tube-type feeder having the multiple lantern style, as illustrated in FIG. 10, or the multiple hourglass configuration illustrated in FIG. 9.

Figure 4:
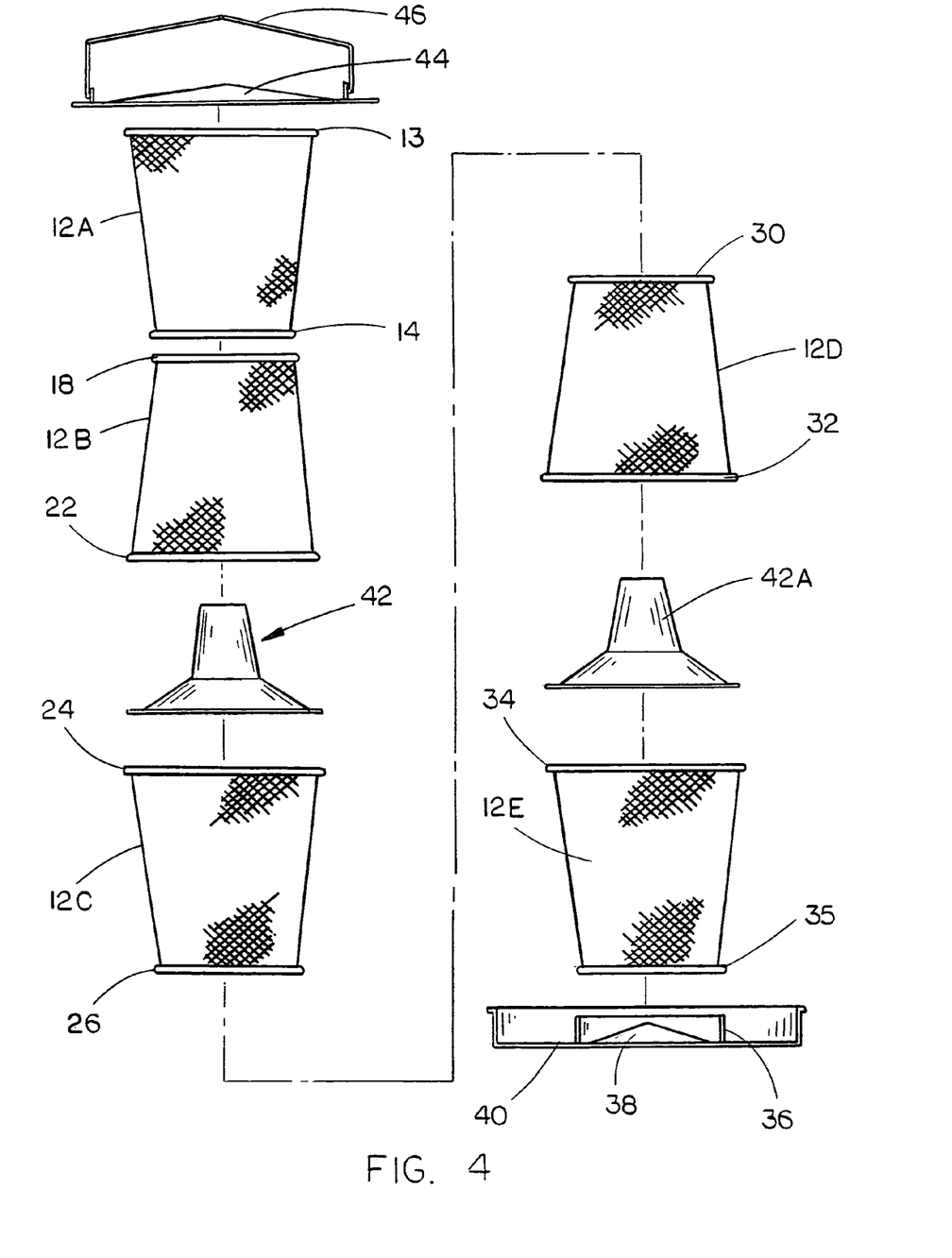
FIG. 4 is an exploded perspective view of the feeder of FIG. 1 without perch rings.
Figure 5:
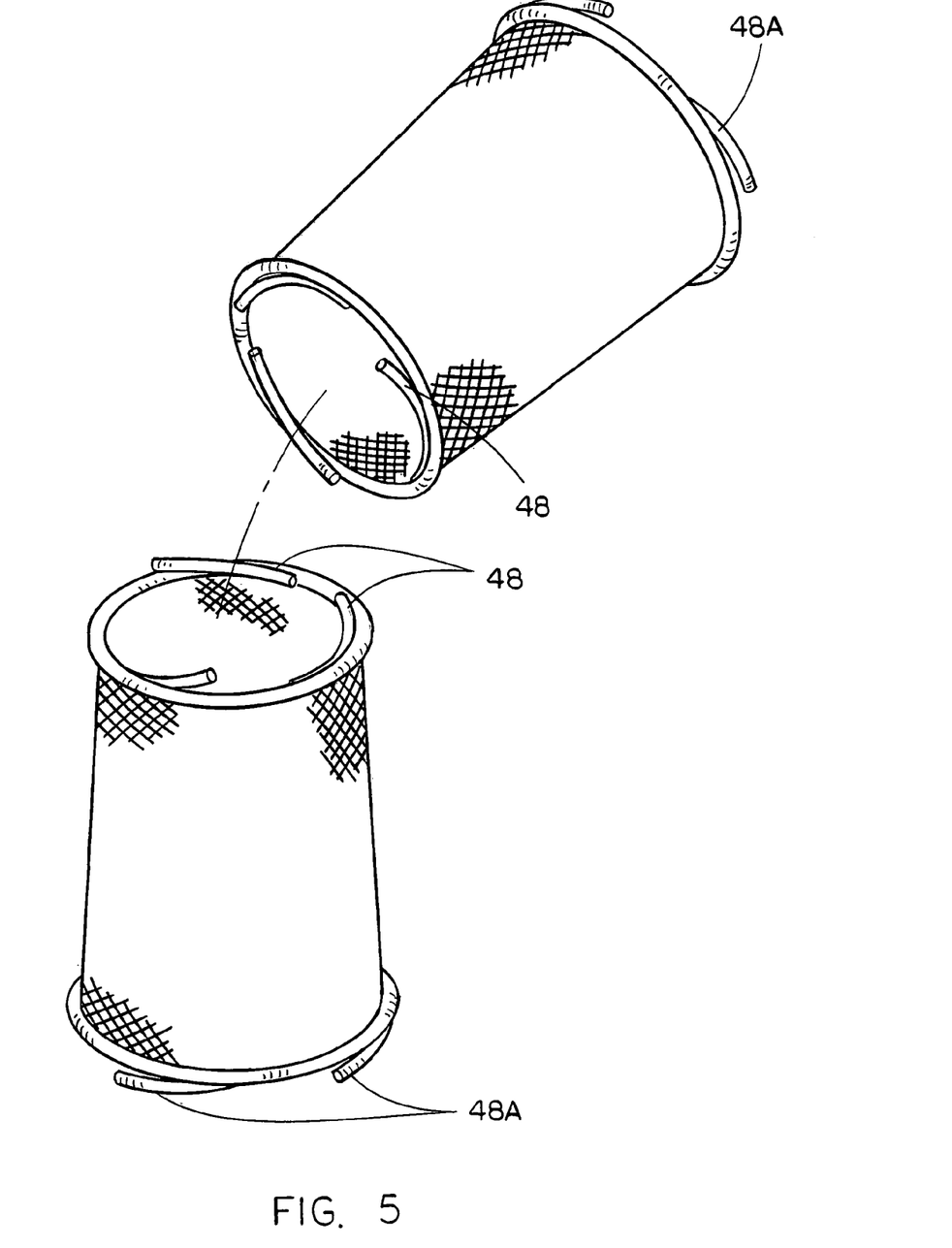
FIG. 5 is an exploded perspective view illustrating one manner in which the feeder bodies may be selectively removably secured to one another in a stacked condition.

FIG. 4 illustrates the feeder without the perch rings mounted thereon. The ties 20 may be utilized to selectively removably secure the adjacent ends of feeder bodies together so that any number of feeder bodies may be secured together. By having the feeder bodies being able to be selectively connected together in a stacked position enables the feeder to be shipped in a disassembled condition and installed at the point of use. FIG. 5 illustrates another way that the feeder bodies may be secured together. As seen in FIG. 5, the upper and lower ends of the feeder bodies are provided with a plurality of arcuate locking members 48A extending therefrom. FIG. 5 illustrates how the locking members 48 may be joined to the locking members 48 of the adjacent feeder body to secure the feeder bodies together. The locking members 48 and 48A permit an easy way of disassembling or assembling the feeder so as to have any number of feeder bodies secured thereto in a stacked condition either in the lantern fashion or the hourglass fashion.

Figures 6, 7:
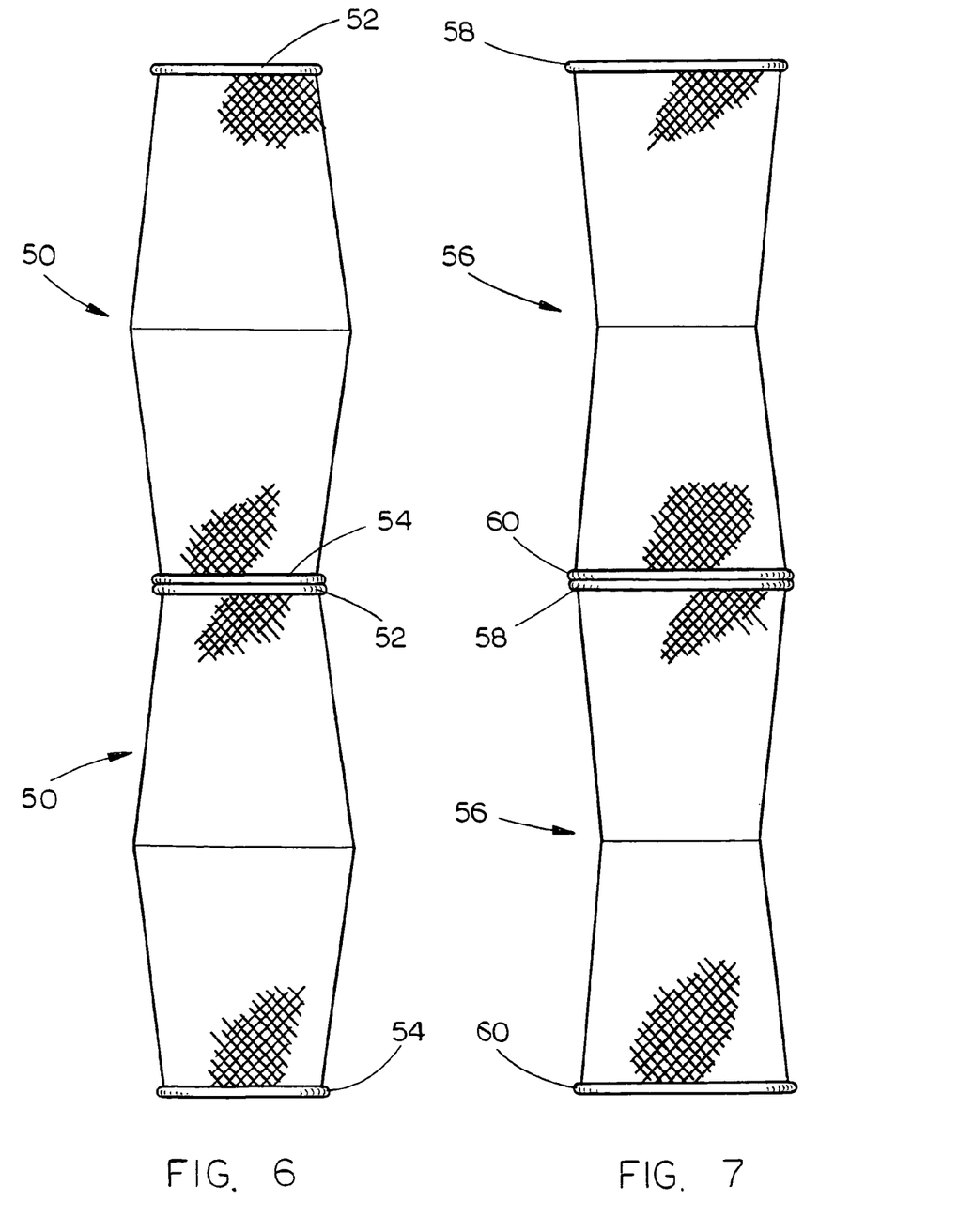
FIG. 6 is a side view of a lantern-style tube feeder wherein each of the feeder bodies define a lantern shape.
FIG. 7 is a side view illustrating the hourglass configuration of the feeder wherein each of the feeder bodies defines an hourglass configuration.

FIG. 6 illustrates a modified form of the tubular feeder bodies. In FIG. 6, each of the feeder bodies 50 has a lantern shape. Each of the bodies 50 has an upper support ring 52 and a lower support ring 54. The upper support ring 52 of the lower feeder body 50 is secured by any convenient means to the support ring 54 of the upper feeder body 50. Any number of feeder bodies 50 may be secured together, either permanently or removably. The wall of the feeder body 50 is comprised of a metal mesh material with the openings thereof sized to maintain niger thistle seed therein while permitting birds to feed therethrough.

FIG. 7 illustrates yet another form of the tubular feeder bodies. In FIG. 7, each of the feeder bodies 56 has an hourglass shape. Each of the bodies 56 has an upper support ring 58 and a lower support ring 60. The upper support ring 58 of the lower feeder body 56 is secured by any convenient means to the support ring 60 of the upper feeder body 56. Any number of feeder bodies 56 may be secured together, either permanently or removably. The wall of the feeder body 56 is comprised of a metal mesh material with the openings thereof sized to maintain niger thistle seed therein while permitting birds to feed therethrough.

In use, the lid 44 is removed from the upper end of the feeder 10 and a hanger 18 is secured to a suitable support such as a branch, etc. Feed is poured into the feeder body from the open upper end of the feeder body 12A and passes downwardly into all of the feeder bodies. The central openings in the even feed baffles 42, 42A permit the feed to flow downwardly into the feeder bodies located therebelow.

As the birds feed from the feeder 10, the main level of feed may drop below the upper end of the baffle 42 or 42A, but a certain amount of feed will be positioned thereabove outwardly of the central opening 44 so that birds may feed from the feeder body 12B even though the main level of feed in the feeder body has dropped therebelow. Similarly, as the feed level in the feeder drops below baffle 42A, a certain amount of feed will remain on the upper surface of the baffle 42A outwardly of the opening 44 so that the birds may feed from the feeder body 12D.

The multi-tiered arrangement of the feeder bodies enables the feeder to have a very large capacity but does not require constant refilling. The multi-tiered feeder also provides a very large perching area together with the optional perch rings 16 and 28. Further, the birds may perch on the optional tray 36 in conventional fashion.

As previously stated, FIGS. 8-14 illustrate feeders having different numbers of tiers, but any number of tiers may be utilized. As seen in the drawings, some of the feeder bodies are of the truncated, cone shape while others have an inverted, truncated cone shape. Further, some of the lowermost feeder bodies will have a truncated, cone shape while some of the lowermost feeder bodies will have an inverted, truncated cone shape.

Thus it can be seen that the invention accomplishes at least all of its stated objectives.

I claim:

1. A multi-tiered feeder, comprising:
a first ring-shaped support defining a central feed fill opening;
a cover member selectively positioned on said first ring-shaped support for selectively closing said central feed fill opening;
a first truncated, cone-shaped metal mesh wall, having upper and lower ends;
said upper end of said first metal mesh wall being secured to said first support and extending downwardly therefrom;
a second ring-shaped support secured to said lower end of said first metal mesh wall;
a third ring-shaped support secured to said second ring-shaped support;
a second truncated, cone-shaped metal mesh wall having upper and lower ends;
said upper end of said second metal mesh wall secured to said third ring-shaped support and extending downwardly therefrom;
a fourth ring-shaped support secured to said lower end of said second metal mesh wall;
a fifth ring-shaped support secured to said fourth ring-shaped support;
a third truncated, cone-shaped metal mesh wall member having upper and lower ends;
said upper end of said third metal mesh wall member being secured to said fifth support ring and extending downwardly therefrom;
a sixth ring-shaped support secured to said lower end of said third metal mesh wall member;
a seventh ring-shaped support secured to said sixth ring-shaped support;
a fourth truncated, cone-shaped metal mesh wall having upper and lower ends;

an eighth ring-shaped support secured to said lower end of said fourth metal mesh wall;

a ninth ring-shaped support secured to said eighth ring-shaped support;

a fifth truncated, cone-shaped metal mesh wall having upper and lower ends;

said upper end of said fifth metal mesh wall being secured to said ninth ring-shaped support and extending downwardly therefrom;

said lower end of said fifth metal mesh wall being closed;

said metal mesh walls being rigid so as to be non-collapsible.

2. The feeder of claim 1 wherein a perch ring is positioned at the juncture of at least some of said metal mesh walls.

3. The feeder of claim 1 wherein a first perch ring is positioned at the juncture of said first and second metal mesh walls and at the juncture of said third and fourth metal mesh walls.

4. The feeder of claim 1 wherein an even feed baffle is provided at the juncture of at least some of said metal mesh walls.

5. The feeder of claim 4 wherein said even feed baffle has a truncated funnel shape with a central opening formed therein.

6. The feeder of claim 5 wherein said baffle has a conical portion.

7. The feeder of claim 1 wherein a first even feed baffle is provided at the juncture of said second and third metal mesh walls and a second even feed baffle is provided at the juncture of said fourth and fifth metal mesh walls.

8. The feeder of claim 7 wherein each of said first and second even feed baffles has a truncated funnel shape with a central opening formed therein.

9. The feeder of claim 8 wherein each of said first and second even feed baffles have a conical portion.

10. The feeder of claim 1 wherein said second and third ring-shaped supports are selectively removably secured together, said fourth and fifth ring-shaped supports are selectively removably secured together, said sixth and seventh ring-shaped supports are secured together, and said eighth and ninth ring-shaped supports are selectively removably secured together.

11. The feeder of claim 1 wherein a tray is provided at said lower end of said fifth metal mesh wall member.

12. The feeder of claim 1 wherein said first and second metal mesh walls define an hourglass configuration, said third and fourth metal mesh walls define an hourglass configuration and wherein said fifth metal mesh wall member has an inverted, cone shape.

13. The feeder of claim 1 wherein some of the adjacent metal mesh walls define an hourglass shape.

14. The feeder of claim 1 wherein some of the adjacent metal mesh walls define a lantern shape.

\* \* \* \* \*